Aug. 5, 1924.  
E. R. BURTNETT  
INTERNAL COMBUSTION ENGINE  
Filed Oct. 14, 1920   3 Sheets-Sheet 2
1,504,093
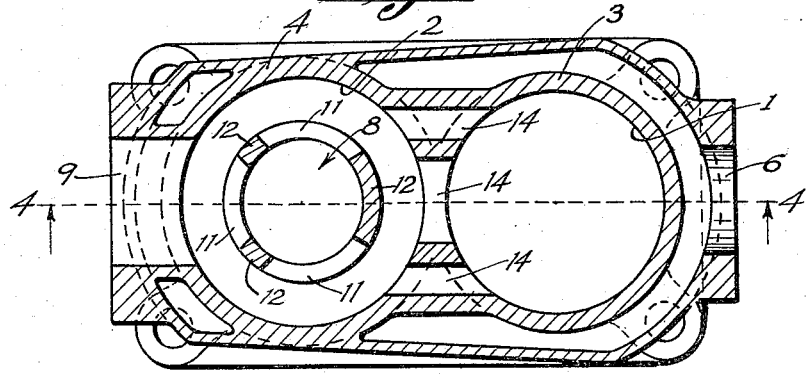
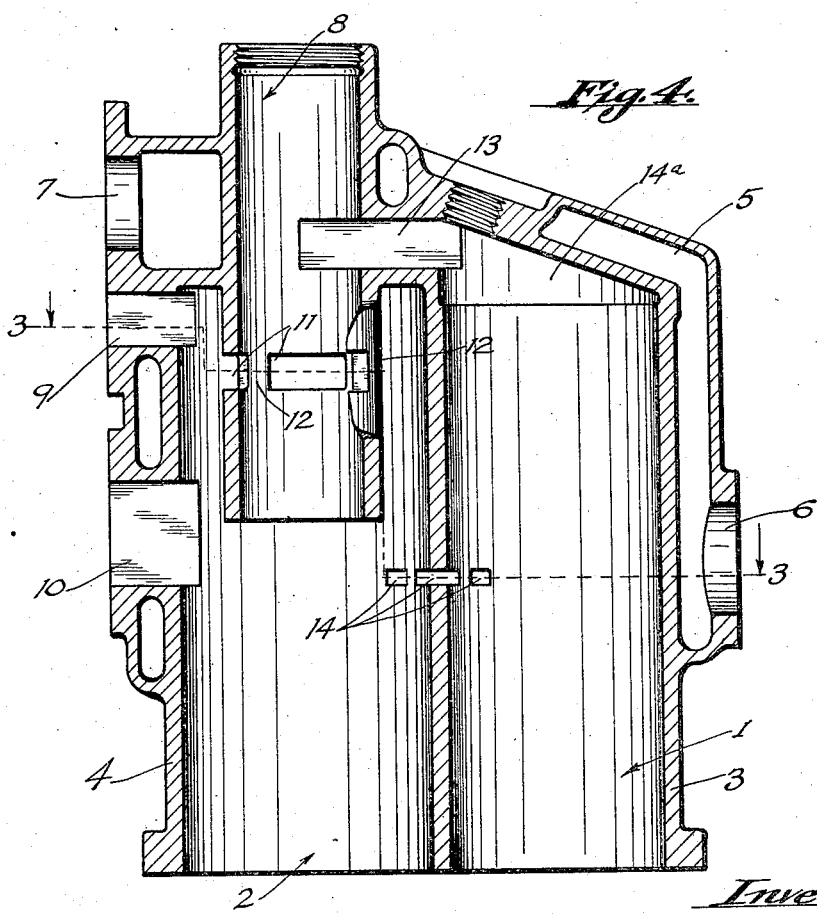

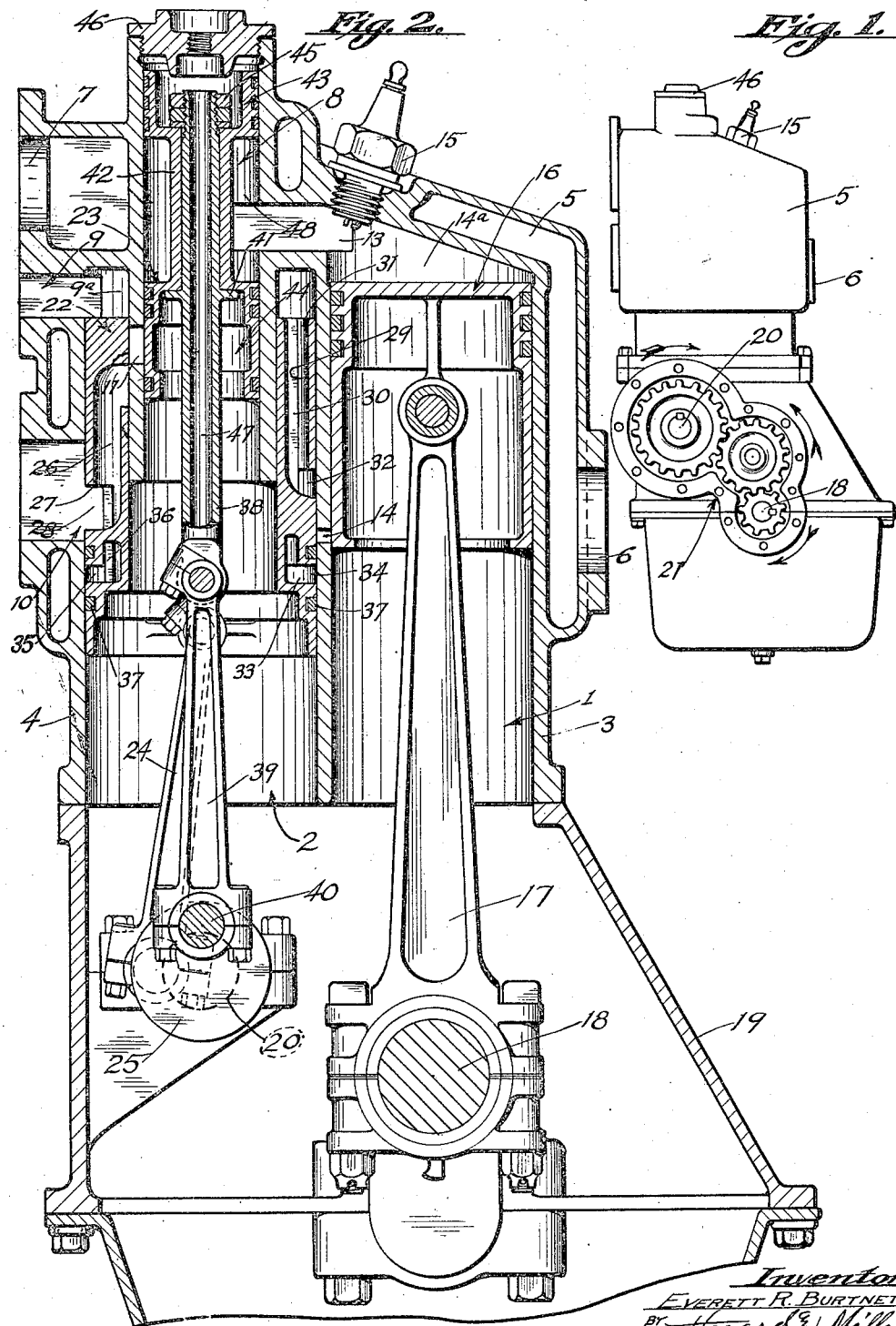

Aug. 5, 1924.
E. R. BURTNETT
1,504,093
INTERNAL COMBUSTION ENGINE
Filed Oct. 14, 1920      3 Sheets-Sheet 3
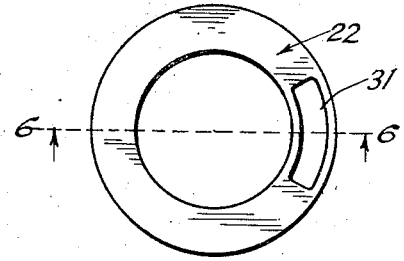
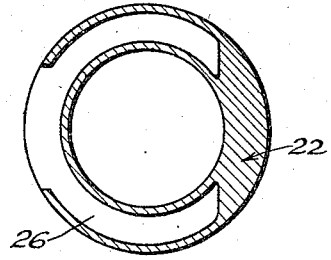
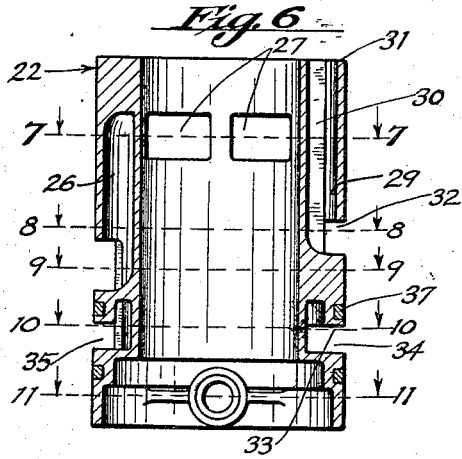
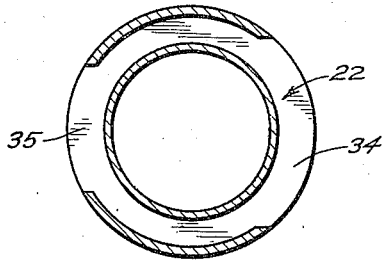
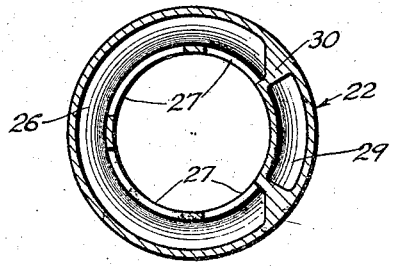
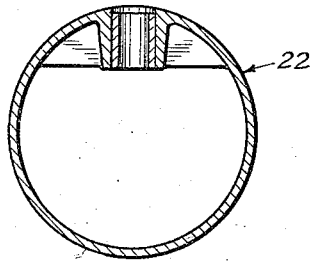
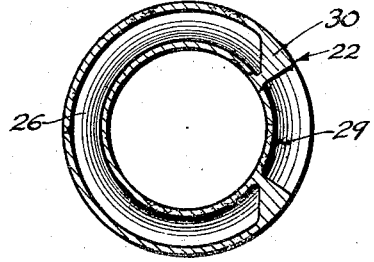
Inventor.
EVERETT R. BURTNETT.
BY Hazard & Miller
Attorneys Patented Aug. 5, 1924.

1,504,093

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed October 14, 1920. Serial No. 416,963.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

It is the principal object of this invention to provide an internal combustion engine wherein the working cylinder is provided with a main port forming both an inlet and a discharge port, and with an auxiliary port which forms a combined auxiliary inlet and discharge. These ports are controlled by a valve mechanism of simplified construction and functioning to supply a fuel charge through the main port, and an auxiliary fuel charge through the auxiliary port when the working piston is upon its dead center at the completion of the suction stroke; and to subsequently discharge the spent gases through the auxiliary port when the working piston is upon its dead center at the completion of the firing stroke and to then discharge the spent gases through the main port during the succeeding exhaust stroke.

The improved construction provides for the efficient cooling of the valve mechanism so that it will not be excessively heated and thereby cause warping and blistering. In prior constructions employing an auxiliary exhaust, the blow-pipe action of the exhaust gases has caused an excessive heating of the portions of the valve mechanism and of the working piston contacted by such action; but in my improved construction the parts subjected to such a heating action are moved between successive exhausts into a position adjacent a water cooled surface so that such excessive heating will be obviated.

It is a still further object of the invention to provide a valve mechanism functioning as above set forth and so constructed as to provide a balanced piston valve structure. The valve mechanism is also so arranged that the said piston valve structure may be readily removed and replaced without disturbing its operating connection, and the valve mechanism is furthermore so designed as to isolate the same from the working piston and its cylinder so that the valve mechanism will safely and efficiently operate at very high engine speeds and temperatures.

Further advantages of the improved construction as well as the details and arrangement of parts will be readily understood from the following description of the accompanying drawings, in which:

Figure 1 is an end elevation of an internal combustion engine constructed in accordance with the invention.

Fig. 2 is a longitudinal section through the internal combustion engine showing one cylinder of the same and its valve mechanism.

Fig. 3 is a transverse section on the line 3—3 of Fig. 4 and showing the engine construction with the working piston and valve mechanism removed.

Fig. 4 is a longitudinal section on the line 4—4 of Fig. 3.

Fig. 5 is an end view of the sleeve valve of the valve mechanism.

Fig. 6 is a longitudinal section on the line 6—6 of Fig. 5.

Figs. 7, 8, 9, 10 and 11 are transverse sections on the lines 7—7, 8—8, 9—9, 10—10 and 11—11 of Fig. 6.

An engine constructed in accordance with the present invention may comprise any number of cylinders and may be arranged for either a two or four cycle operation. In the present embodiment of the invention I have illustrated one cylinder of an engine and its valve mechanism in which a four cycle operation is employed.

The portion of the engine forming the working cylinder and the chamber containing the valve mechanism for the same is cast as an integral structure shown in Figs. 3 and 4, and this structure is mounted upon a suitable crank casing. The working cylinder is shown at 1 and the valve chamber is shown at 2 as a cylindrical chamber parallel to and along side the working cylinder. The walls of the working cylinder and valve chamber are shown at 3 and 4 and are surrounded by a water jacket 5, preferably, having a water inlet 6 at the side of the working cylinder opposite the valve chamber, and a water discharge 7, preferably, located at the side of the valve chamber opposite the working cylinder and adjacent the upper end of said valve chamber. An interior cylinder 8 depends within the cylindrical valve chamber in spaced relation from the wall of the same, and the water jacket 5, preferably, surrounds the portion of this inner cylinder which extends above the valve chamber 2.

A fuel inlet 9 extends through the wall of chamber 2 below the portion of water jacket 5 adjacent the discharge 7, and said fuel inlet communicates with the upper end of chamber 2. A fuel discharge 10 is longitudinally alined below inlet 9 and also communicates with the chamber 2. The inner cylinder 8 which extends into chamber 2 depends below fuel inlet 9 and to a point adjacent fuel discharge 10, and said cylinder is provided with ports 11 at a point therein between inlet 9 and discharge 10. These ports are arranged around the wall of cylinder 8 so as to leave a solid portion 12 of said wall at its side which is adjacent working cylinder 1.

A main port 13 causes communication between the compression chamber 14$^a$ at the upper end of cylinder 1 and the cylinder 8 at a point therein above ports 11. A plurality of auxiliary ports 14 connect cylinder 1 and chamber 2 at a point below the end of cylinder 8 but in alinement with discharge opening 10.

A usual spark plug 15 is inserted in the compression chamber of cylinder 1 adjacent the port 13 in the usual manner, and a usual working piston 16 is provided in cylinder 1. This piston is connected by connecting rod 17 to the main crank shaft 18, and the movement of the piston is such that when upon its lower dead center the ports 14 will be opened by the piston, to the working chamber above the same. The crank casing housing the main crank shaft may be of usual construction as shown at 19, and the casting forming the working cylinder and valve chamber is mounted upon said casing. A crank shaft 20 is journaled in the crank casing below valve chamber 2 and is driven at one-half the speed by a usual train of gearing 21.

The valve mechanism received in chamber 2 comprises a sleeve valve 22 slidable in the space between cylinder 8 and the wall of cylinder 2 and a piston valve 23 reciprocating within cylinder 8. The sleeve valve is connected by a connecting rod 24 to a crank throw 25 of crank shaft 20, and the sleeve valve is, preferably so set that when the working piston is at its upper dead center the sleeve valve will be midway between its dead centers and upon its up stroke. When in this position the upper end of the sleeve valve is in alinement with the lower edge of inlet 9 so as to leave an annular space 9$^a$ at the upper end of the valve chamber in alinement with inlet 9 and above the valve sleeve. With the sleeve valve in this position the ports 11 are closed by the same.

At the side of the sleeve valve adjacent discharge port 10 the sleeve valve is provided with a longitudinally extending port 26 which extends around a portion of the sleeve valve and is provided with openings 27 in its inner circumference and extending around a portion of the sleeve valve. The openings 27 are arranged in spaced relation below the upper end of the sleeve valve, so that when the valve sleeve is in the position shown in Fig. 2 ports 11 will be closed by the portion of the sleeve valve above openings 27, and the latter will be closed by the wall of cylinder 8. The opposite end of port 26 is provided with an opening 28 in the outer wall of said sleeve valve and in communication with discharge 10. At the opposite side of sleeve valve 22 a longitudinal port 29 is provided spaced from port 26 by the wall 30. This port has an opening at its upper end in the end surface of the sleeve valve as shown at 31, and at its lower end the port is provided with an opening 32 in the outer wall of the sleeve valve. With the parts as shown in Fig. 2, this opening is closed by the wall of the valve chamber, but when the sleeve valve is reciprocated the opening 32 is brought into alinement with the ports 14.

In the portion of the sleeve valve below openings 28 and 32 an annular port 33 is provided having an opening 34 at the side of said sleeve valve adjacent the working cylinder. At the opposite side of port 33 an opening 35 leads from the same. The port 33, preferably, also communicates with port 26 as shown at 36 so that said port is open to the opening 28. Piston rings 37 are, preferably, provided in the outer surface of the sleeve valve above and below port 33 and its openings 34—35 in order to provide a leak proof joint between the sleeve valve and the wall of cylinder 2. In the position shown in Fig. 2, port 33 and its openings are below ports 14 and discharge 10, but the upward movement of the sleeve valve is arranged to cause communication between port 33 and ports 14 by means of opening 34 and communication between said port and the discharge 10 by way of opening 35.

The piston valve reciprocating within cylinder 8 comprises a hollow valve stem 38 secured to connecting rod 39 which is mounted upon a crank throw 40 of crank shaft 20. As shown in Fig. 2, when the working piston is at its upper dead center the stem of the piston valve is also at its upper dead center. Intermediate of its ends stem 38 is provided with an annular shoulder 41 adapted to support the piston valve. This piston valve comprises a sleeve 42 received over stem 38 and having piston heads 43—44 at its upper and lower ends. The piston valve is slid over the end of stem 38 until it rests upon shoulder 41 and is removably retained in such position by means of nuts 45 threaded upon the upper end of the stem.

The end of cylinder 8 above the piston valve is provided with a removable threaded cap 46 whereby by simply removing said cap and the retaining nuts 45 the piston valve may be removed from its stem for repair or replacement without disturbing the connection between the piston valve stem and crank shaft 20. The bore of hollow stem 38 is shown at 47 as open at its respective ends so that the lubricating oil splashed up within the crank case may be sprayed through the hollow piston valve stem and from thence through its open upper end to the piston valve.

With the parts in the position shown in Fig. 2, piston head 44 will close ports 11 and the portion of the piston valve between its heads shown at 48 is open to the port 13. As the piston valve is lowered the space 48 communicates with ports 11, and the port 13 is partially closed by the upper piston head 43.

The operation of the engine is as follows: With the parts in the position shown in Fig. 2 a compressed charge is in the compression chamber 14$^a$ and the working piston is at the beginning of its expansion stroke. The main inlet and exhaust port 13 is shut off by the piston valve head 44 from communication with ports 11. The auxiliary ports 14 are closed by the working piston 15 and by the sleeve valve positioned with opening 32 and opening 34 both out of alinement with said auxiliary ports.

When the working piston reaches its lower dead center it will open ports 14. At the same time the sleeve valve will have moved upwardly until opening 34 registers with ports 14, and as a consequence an auxiliary exhaust is formed when the working piston reaches its lower dead center. The passage for this auxiliary exhaust extends through ports 14 and port 33 to the discharge 10, the upward movement of the sleeve valve having brought the opening 35 of port 33 into register with discharge 10. The upward movement of the sleeve valve has also brought openings 27 into register with ports 11, but said ports are still cut off from port 13 by the piston valve head 44 which has moved down until the upper portion of the same covers ports 11.

During the succeeding exhaust stroke the auxiliary ports will be shut off by the upward movement of the working piston, and the downward movement of the sleeve valve will also move opening 34 out of register with said auxiliary ports. During this downward movement of the sleeve valve, openings 27 will gradually move out of alinement with ports 11 until the sleeve valve is again in the position shown in Fig. 2, but during the time that ports 11 and openings 27 are in communication the continued downward movement of the piston valve will move the space 48 of the piston valve into alinement with ports 11 so that a main exhaust passage is provided through port 13, space 48, ports 11, openings 27, and the port 26 leading to the discharge 10.

At the beginning of the suction stroke this exhaust passage will have been again closed by the movement of openings 27 out of register with ports 11. During the suction stroke the piston valve moves upwardly so that head 44 gradually closes ports 11 so as to shut off the same from the space 48, and at the same time the continued downward movement of the sleeve valve will move the upper end of the same below ports 11 so that they are gradually opened to the chamber 9$^a$ and the inlet 9. While the ports 11 are thus open a main fuel inlet passage is provided through inlet 9, chamber 9$^a$, the ports 11, space 48 and port 13. When the working piston reaches its lower dead center at the completion of the suction stroke, the downward movement of the sleeve valve will have caused opening 32 to register with auxiliary ports 14 and an auxiliary fuel inlet passage is thus provided from chamber 9$^a$, through port 29, opening 32 and the ports 14, it being understood that the working piston will have again opened these latter ports when it reaches its lower dead center.

As the working piston passes over its lower dead center it will again shut off ports 14, and the upward movement of the sleeve valve will also move opening 32 out of alinement with the ports 14. As the compression stroke starts, the upward movement of the piston valve will have again shut off ports 11 so that the working cylinder is closed to permit of the compression of the fuel charge within the same. At the completion of the compression stroke the parts will have returned to the position shown in Fig. 2 ready for the succeeding cycle of operation as thus described.

It will be noted that during the expansion stroke of the engine the sleeve valve is moving downwardly to shut off ports 11 from opening 27, and this downward movement of the sleeve valve will cause a preliminary suction through inlet 9 to initiate the flow of fuel from inlet 9 into chamber 9$^a$ and toward the working cylinder. During the succeeding suction stroke, as openings 11 are uncovered by the continued downward movement of the sleeve valve, the flow of fuel toward the working cylinder having been thus initiated, will tend to quicken the flow of the fuel through the inlet passage to the working cylinder.

It will also be noted that during the opening of ports 14 at the completion of the expansion stroke, in order to form an auxiliary exhaust, a blow pipe action of the exhausting gases will be created through ports 14 against the sleeve valve. The provision of piston rings 37 will, however, prevent any flames passing through ports 14 moving upwardly or downwardly between the sleeve valves and its cylinder, and furthermore, such a blow pipe action will be prevented from causing excessive heating of the sleeve valve, since immediately after the passage of the gases through the auxiliary exhaust, this portion of the sleeve valve is reciprocated relative to the wall of cylinder 2 which is cooled by the water jacket 5. In similar manner excessive heating of the exhaust port 26 is prevented by the reciprocation of the sleeve valve relative to the water cooled wall of cylinder 2 after the passage of the exhaust gases through port 26. The utilizing of ports 11, space 48, and the port 13 as both a main inlet passage and a main exhaust passage will prevent excessive heating of such passageway by the cooling action of the incoming charge after each discharge of the exhaust gases through said passageway. The water jacket wall of cylinder 8 opposite space 48 will also provide a cooling action for this space.

It will also be observed that the provision of a piston valve having the two heads 43—44 arranged above and below the port 13 provides a balanced construction whereby either the fuel charge entering through port 13 and then being compressed, as well as the exhaust gases discharging through the port 13 and the space between the heads of the piston valve, will exert equal pressure upon the piston valve heads. As a consequence the energy required to move the piston valve will not be increased by resistance from the fuel charge or exhaust gases.

Various changes may be made without departing from the spirit of the invention as claimed.

What is claimed is:

1. The combination in an internal combustion engine, of a working cylinder having a main port and an auxiliary port, and a valve mechanism having a passage co-operating with said main port to form both a fuel inlet and spent gas discharge, said valve mechanism also co-operating with said auxiliary port to form an auxiliary fuel inlet and spent gas discharge with means for cooling the portion of said valve mechanism forming said auxiliary spent gas discharge between successive discharges through the same.

2. The combination in an internal combustion engine, of a working cylinder having a main port and an auxiliary port, and a valve mechanism having a passage co-operating with said main port to form both a fuel inlet and spent gas discharge, said valve mechanism also co-operating with said auxiliary port to form an auxiliary fuel inlet and spent gas discharge.

3. The combination in an internal combustion engine, of a working cylinder, a valve chamber, a combined main inlet and discharge port and a combined auxiliary inlet and discharge port connecting said chamber and cylinder, inlet and discharge openings in said chamber, and a valve mechanism in said chamber selectively causing communication between said main and auxiliary ports and said inlet and discharge openings.

4. The combination in an internal combustion engine, of a working cylinder, a valve chamber cylinder alongside the same, an interior cylinder depending within said valve chamber and projecting above the latter, a water jacket surrounding said working cylinder, valve chamber, and projecting portion of said interior cylinder; a main port connecting the upper end of said working cylinder and the projecting portion of said interior cylinder, an auxiliary port connecting said working cylinder and said valve cylinder, a working piston opening said auxiliary port when at its lower dead center, a sleeve valve operable between said interior cylinder and the wall of said valve cylinder, a piston valve operable within said interior cylinder, said valves operating at one-half engine speed with the piston valve a quarter revolution in advance of the sleeve valve, a port at the upper end of said sleeve valve at one side thereof and extending from the side of said sleeve valve to its upper end, a port at the upper end of said sleeve valve at its opposite side and extending from the interior of said sleeve valve in spaced relation below its upper end to the exterior of said sleeve valve, said sleeve valve also having a port in its lower end extending from side to side of the same and communicating with said last mentioned port, a fuel inlet leading to said valve cylinder above said sleeve valve, a port in said interior cylinder below said fuel inlet and controlled by said sleeve valve and piston valve, and a spent gas discharge from said valve cylinder in alinement with the last mentioned port of said sleeve valve, said valve mechanism functioning in the manner set forth.

5. The combination in an internal combustion engine, of a working cylinder, a valve chamber cylinder alongside the same, a combined main inlet and exhaust port connecting said cylinders, a water jacket surrounding said working cylinder and valve chamber, an auxiliary port connecting said working cylinder and said valve cylinder, and a valve mechanism functioning in said valve chamber to open and close said ports for inlet and discharge of fuel, said valve mechanism moving along the water jacketed wall of said valve chamber between successive exhaust gas discharges.

6. The combination in an internal combustion engine, of a working cylinder, a valve chamber cylinder alongside the same, an interior cylinder depending within said valve chamber and projecting above the latter, a main port connecting the upper end of said working cylinder and the projecting portion of said interior cylinder, an auxiliary port connecting said working cylinder and said valve cylinder, a sleeve valve operable between said interior cylinder and the wall of said valve cylinder, and a piston valve operable within said interior cylinder, said valves co-operating to provide a fuel inlet and discharge through said main port and an auxiliary fuel inlet and discharge through said auxiliary port.

7. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, a sleeve valve operable between said interior cylinder and the wall of said valve cylinder, and a piston valve operable within said interior cylinder, said valves controlling the port in said interior cylinder to provide a fuel inlet and discharge through said main port and an auxiliary fuel inlet through said auxiliary port, said sleeve valve also controlling an auxiliary spent gas discharge through said auxiliary port.

8. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, and valvular means operable between said interior cylinder and the wall of said valve cylinder, and within said interior cylinder, said valvular means controlling the port in said interior cylinder to provide a fuel inlet and discharge through said main port, and also controlling the auxiliary port to form an auxiliary fuel inlet and discharge.

9. The combination in an internal combustion engine, of a working cylinder, a valve chamber cylinder alongside the same, an interior cylinder depending within said valve chamber, a port in said interior cylinder, an auxiliary port connecting said working cylinder and said valve cylinder, a sleeve valve operable between said interior cylinder and the wall of said valve cylinder, and a piston operable within said interior cylinder, said valves controlling the port in said interior cylinder to provide an auxiliary fuel inlet through said port, said sleeve valve also controlling an auxiliary spent gas discharge through said auxiliary port.

10. The combination in an internal combustion engine, of a working cylinder, a valve chamber cylinder alongside the same, an interior cylinder depending within said valve chamber and projecting above the latter, a water jacket surrounding said working cylinder, valve chamber and projecting portion of said interior cylinder, a main port and an auxiliary port connecting said working cylinder and said valve cylinder, a sleeve valve operable between said interior cylinder and the wall of said valve cylinder, and a piston valve operable within said interior cylinder, said valves co-operating to provide a fuel inlet and discharge through said main port and an auxiliary full inlet and discharge through said auxiliary port.

11. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, a sleeve valve operable between said interior cylinder and the wall of said valve cylinder, a piston valve operable within said interior cylinder, a port at the upper end of said sleeve valve at one side thereof and extending from the side of said sleeve valve to its upper end, and a port at the upper end of said sleeve valve at its opposite side and extending from the interior of said sleeve valve in spaced relation below its upper end to the exterior of said sleeve valve, said sleeve valve also having a port in its lower end extending from side to side of the same and communicating with said last mentioned port.

12. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, a sleeve valve operable between said interior cylinder and the wall of said valve cylinder, a piston valve operable within said interior cylinder, a port at the upper end of said sleeve valve at one side thereof and extending from the side of said sleeve valve at a point arranged for communication with said auxiliary fuel port to the upper end of said sleeve valve, and a port at the upper end of said sleeve valve at its opposite side and extending from the interior of said sleeve valve in spaced relation below its upper end and at a point arranged for communication with the port of said interior cylinder to the exterior of said sleeve valve, said sleeve valve also having a port in its lower end extending from side to side of the same at a point arranged for communication with the auxiliary port and communicating with said last mentioned port.

13. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, a sleeve valve operable between said interior cylinder and the wall of said valve cylinder, a piston valve operable within said interior cylinder, a port at the upper end of said sleeve valve at one side thereof and extending from the side of said sleeve valve at a point arranged for communication with said auxiliary fuel port to the upper end of said sleeve valve, and a fuel inlet leading to said valve cylinder above said sleeve valve.

14. The combination in an internal combustion engine, of a working cylinder, a valve chamber cylinder alongside the same, an interior cylinder depending within said valve chamber, a port in said interior cylinder, a main port connecting the upper end of said working cylinder and said interior cylinder, an auxiliary port connecting said working cylinder and said valve cylinder, a sleeve valve operable between said interior cylinder and the wall of said valve cylinder, a piston valve operable within said interior cylinder, a port at the upper end of said sleeve valve at its opposite side and extending from the interior of said sleeve valve in spaced relation below its upper end and at a point arranged for communication with the port of said interior cylinder to the exterior of said sleeve valve, said sleeve valve also having a port in its lower end extending from side to side of the same at a point arranged for communication with the auxiliary working cylinder port and communicating with said last mentioned port, and a spent gas discharge from said valve cylinder in alinement with the last mentioned port.

In testimony whereof 1 have signed my name to this specification.

EVERETT R. BURTNETT.